(12) United States Patent
Nguyen

(10) Patent No.: US 11,408,527 B2
(45) Date of Patent: Aug. 9, 2022

(54) REINFORCEMENT BAND FOR IRRIGATION VALVE

(71) Applicant: The Toro Company, Bloomington, MN (US)

(72) Inventor: Quynh Nguyen, Montclair, CA (US)

(73) Assignee: The Toro Company, Bloomington, MN (US)

( * ) Notice: Subject to any disclaimer, the term of this patent is extended or adjusted under 35 U.S.C. 154(b) by 328 days.

(21) Appl. No.: 16/655,133

(22) Filed: Oct. 16, 2019

(65) Prior Publication Data

US 2020/0116271 A1 Apr. 16, 2020

Related U.S. Application Data

(60) Provisional application No. 62/746,479, filed on Oct. 16, 2018.

(51) Int. Cl.
*F16K 27/00* (2006.01)
*F16L 9/12* (2006.01)
*F16L 47/24* (2006.01)

(52) U.S. Cl.
CPC .............. *F16K 27/00* (2013.01); *F16L 9/121* (2013.01); *F16L 47/24* (2013.01)

(58) Field of Classification Search
CPC . F16K 27/00; F16L 9/121; F16L 47/16; F16L 47/24
See application file for complete search history.

(56) References Cited

U.S. PATENT DOCUMENTS

| | | | | |
|---|---|---|---|---|
| 4,682,797 A | * | 7/1987 | Hildner | F16L 47/16 285/40 |
| 5,366,257 A | * | 11/1994 | McPherson | F16L 47/32 285/148.11 |
| 5,979,863 A | | 11/1999 | Lousberg | |
| 6,394,413 B2 | | 5/2002 | Lohde et al. | |
| 7,597,363 B2 | * | 10/2009 | Hikmat | F16L 47/16 285/392 |
| 8,360,250 B2 | | 1/2013 | Nguyen et al. | |
| 9,261,215 B2 | * | 2/2016 | Kieper | F16L 19/0218 |
| 2003/0184085 A1 | * | 10/2003 | Thompson | F16L 21/002 285/92 |
| 2010/0038905 A1 | * | 2/2010 | Hikmat | F16L 47/16 285/392 |
| 2017/0059075 A1 | | 3/2017 | Ueno | |

* cited by examiner

*Primary Examiner* — Reinaldo Sanchez-Medina
(74) *Attorney, Agent, or Firm* — Inskeep IP Group, Inc.

(57) ABSTRACT

A metal reinforcement band is embedded around the inlets and outlets of a valve to help prevent cracking the plastic bodies of the inlets and outlets. This metal band is embedded in between an outer diameter and a threaded inner diameter of the inlets and the outlets of a valve by an injection molding process.

17 Claims, 8 Drawing Sheets

REINFORCEMENT BAND FOR IRRIGATION VALVE

RELATED APPLICATIONS

This application claims priority to Patent Application Ser. No. 62/746,479, filed Oct. 16, 2018, entitled Reinforcement Band For Irrigation Valve, which is hereby incorporated herein by reference in its entirety.

BACKGROUND OF THE INVENTION

This Application is directed to a metal band reinforced plastic inlets and outlets of a sprinkler valve to help prevent cracking of the plastic inlets and outlets.

Flow control valves are a well-known and integral part of most irrigation systems. A typical example can be seen in U.S. Pat. Nos. 6,394,413 and 8,360,250, hereby incorporated by reference.

These valves control the flow of water through an upstream pipe and thereby turn sprinklers fed by the pipe on and off. Such valves are usually remotely actuated by control signals sent from an automated irrigation controller. Often these control signals are electric current sent from the controller to a solenoid in the valve which ultimately controls whether the valve is open or closed.

Solenoid-activated diaphragm-operated valves for use in irritation systems are well known. One example can be seen in U.S. Pat. No. 6,394,413 to Lohde et al., previously incorporated by reference.

This style of valve has a closure member with a sealing surface which moves against or away from an annular seat to close or open the valve. Integral to the closure member is a diaphragm positioned to seal off an upper portion of the valve. A metering passage allows water to enter the upper portion and thereby build up pressure to maintain the closure member in a closed position.

When the valve is to be opened, the fluid pressure in the upper portion is relieved by bleeding fluid out of the diaphragm chamber through a manual valve or by a remotely operated solenoid valve. Relieving this pressure allows the closure member to move upwards as water passes through the valve. The discharged water is conveniently released into the passageway, beyond the primary flow-controlling sealing member, near the outlet port.

The valve body of the flow control valves includes an inlet port to receive an inlet pipe of the irrigation system which carries water under pressure. Similarly, the valve body also includes one or more outlet ports which are connected to outlet pipes of the irrigation system and release water out when the valve is open.

Irrigation valves, such as those seen in U.S. Pat. No. 8,360,250, are typically composed mostly of a hard plastic/polymer (e.g., nylon) which allows for reduced manufacturing costs and lighter weight vs. metal or a similar material. One problem associated with hard plastic materials is that the inlets and outlets of the valve can crack due to over-tightening when connecting pipes and/or from surges of high water pressure.

Some valves include a metal band or sleeve around the outer diameter of the inlets and outlets to provide reinforcement to help prevent cracking. For example, U.S. Pat. Application No. 2017/0059075 A1 discloses an aluminum ring fitted on the exterior of the inlet and outlet ports of the valve body for reinforcement of the connections of the inlet and outlet ports to the inlet and outlet pipes of the irrigation system. Another example of an external support or ring is disclosed in U.S. Pat. No. 5,979,863 in which the central cylindrical portion of the valve body is externally fitted with an annular ring or band to support the wall of the cylindrical portion of the valve body from collapsing under the pressure of water and extensive use.

However, such type of external metal band surrounding the plastic body tends to have a coefficient of expansion that is different from plastics, which can result in expansion or contraction of the annular ring or band relative to the inlet/outlets. The expansion of the external metallic ring or band may cause a gap between this band and the external surface of the inlet and outlet ports. In that respect, the externally fitted metallic ring or band may not always provide enough support or reinforcement of the plastic inlet/outlets.

Therefore, a need exists to manufacture a different design of reinforced inlets and outlets of a sprinkler valve that will not crack due to over-tightening when connecting to the inlet and outlet pipes of the irrigation system, or from surges of high water pressure.

OBJECTS AND SUMMARY OF THE INVENTION

It is an object of the invention to provide improved design of inlets and outlet of the valve body which do not crack under water pressure.

It is another object of the invention to provide an improved design of reinforced inlets and outlets of an irrigation valve body that include an embedded reinforced metal ring or band. These embedded bands help prevent a gap from forming between this band and the plastic surface of the inlets and outlets, thereby improving the support they provide for adjacent portions of the plastic.

In one preferred embodiment, the present invention includes a valve body which comprises an inlet having a first outer diameter and a first threaded inner diameter; an outlet having a second outer diameter and a second threaded inner diameter; and an optional second outlet comprising a third outer diameter and a third threaded inner diameter. A reinforcement sleeve is embedded in between each of the first outer diameter and the first threaded inner diameter of the inlet, the second outer diameter and the second threaded inner diameter of the outlet and the third outer diameter and the third threaded inner diameter of the optional second outlet.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
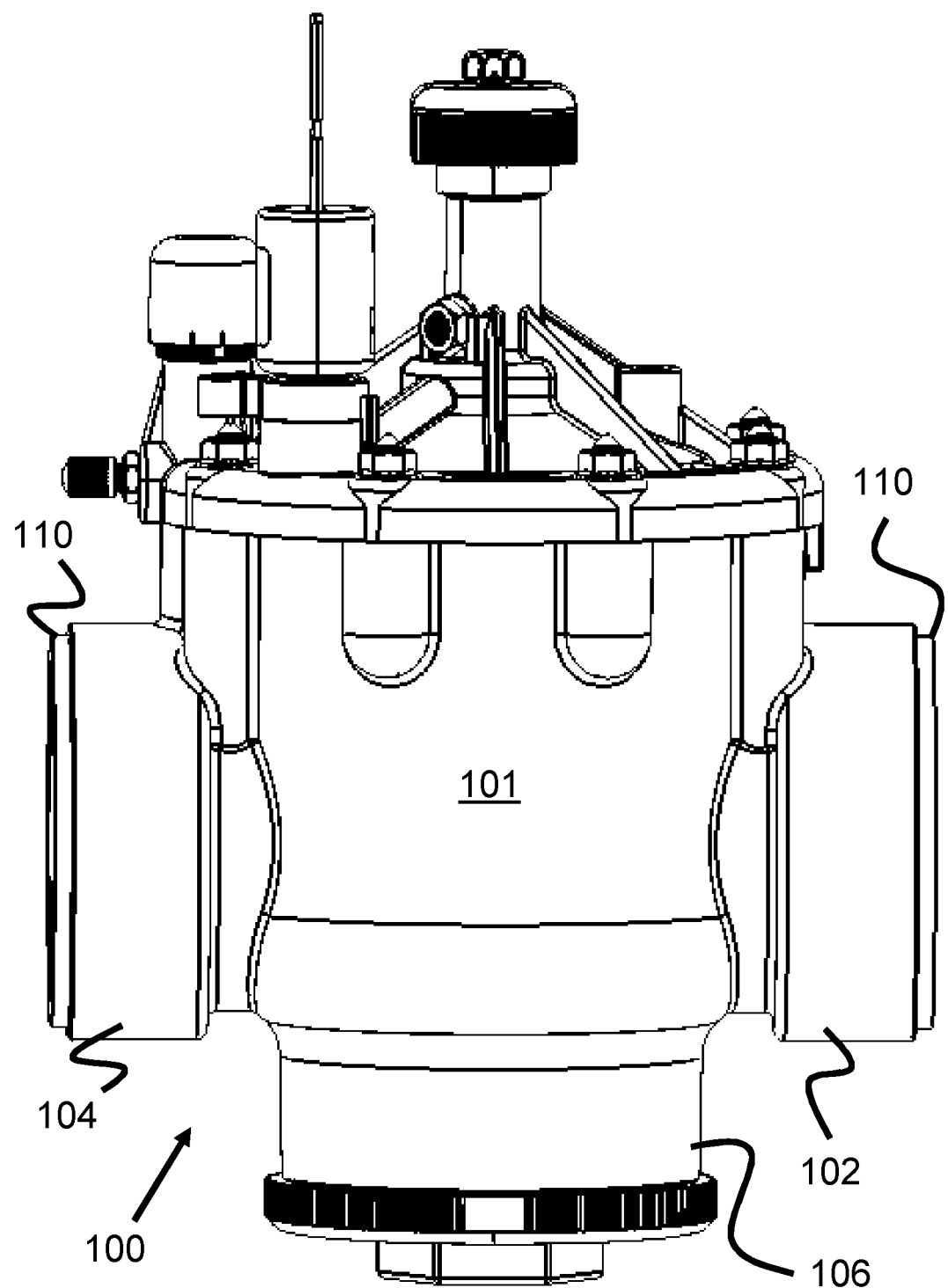
FIG. 1 illustrates a front view of the irrigation valve body according to a preferred embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 2:
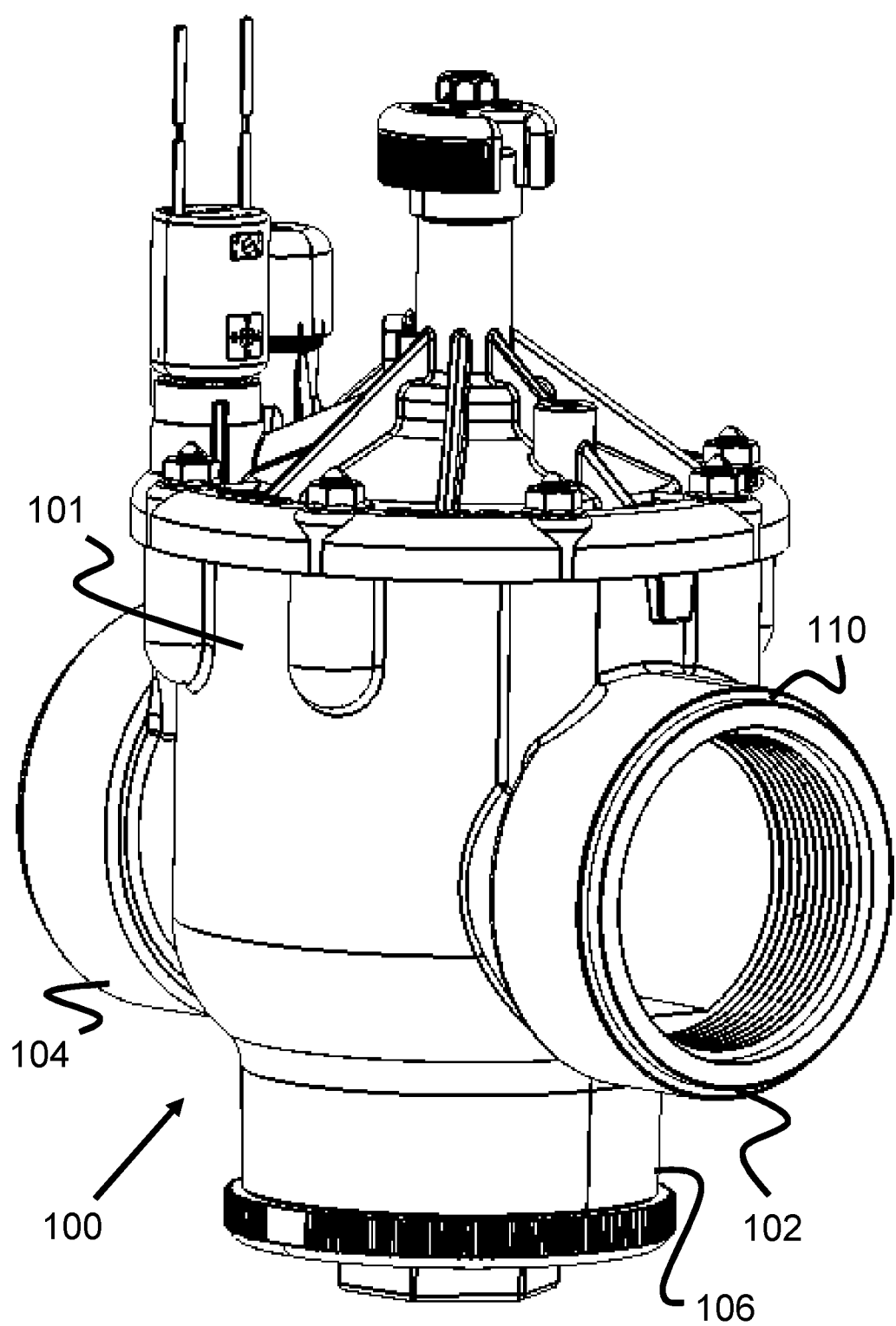
FIG. 2 illustrates a perspective view of the irrigation valve body according to a preferred embodiment of the present invention.
Figure 3:
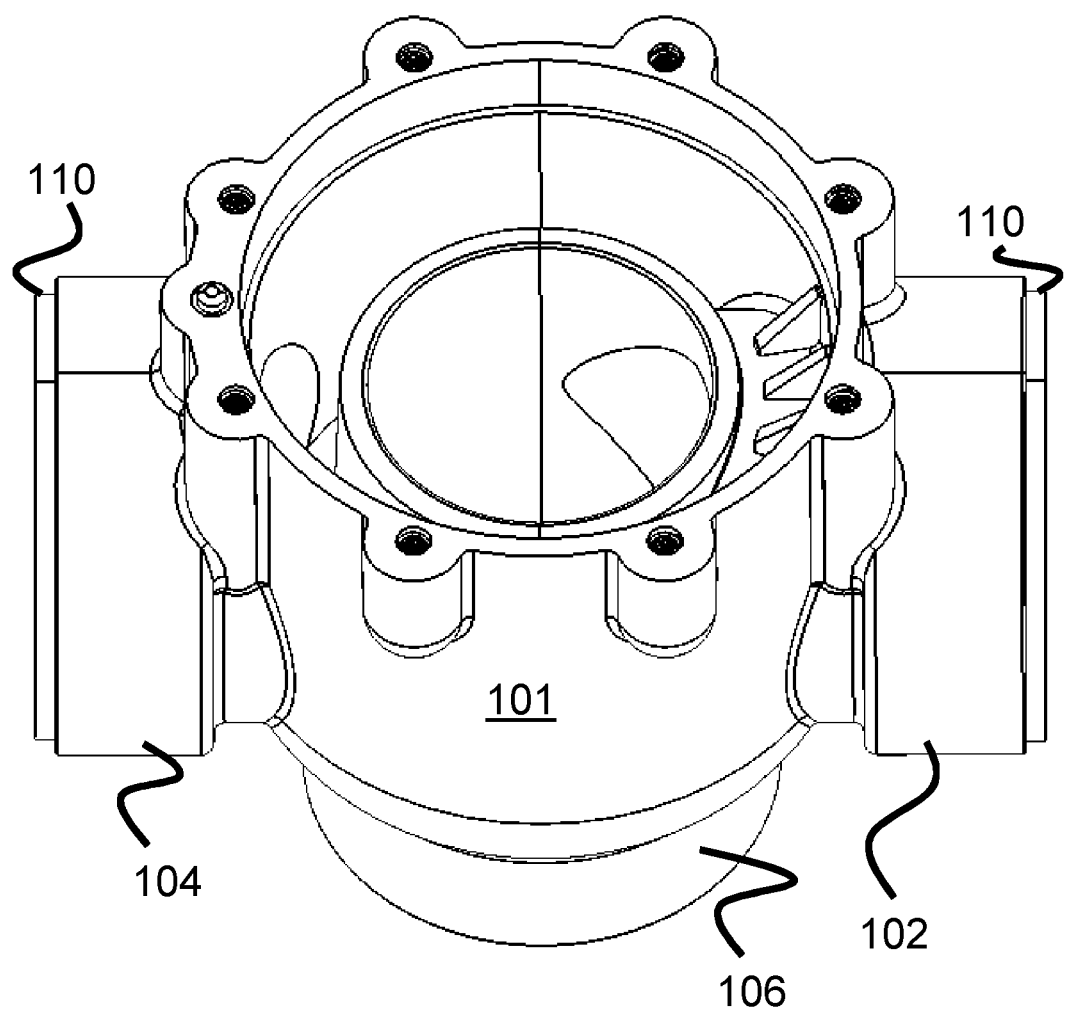
FIG. 3 illustrates a top view of the irrigation valve body according to a preferred embodiment of the present invention.
Figure 4:
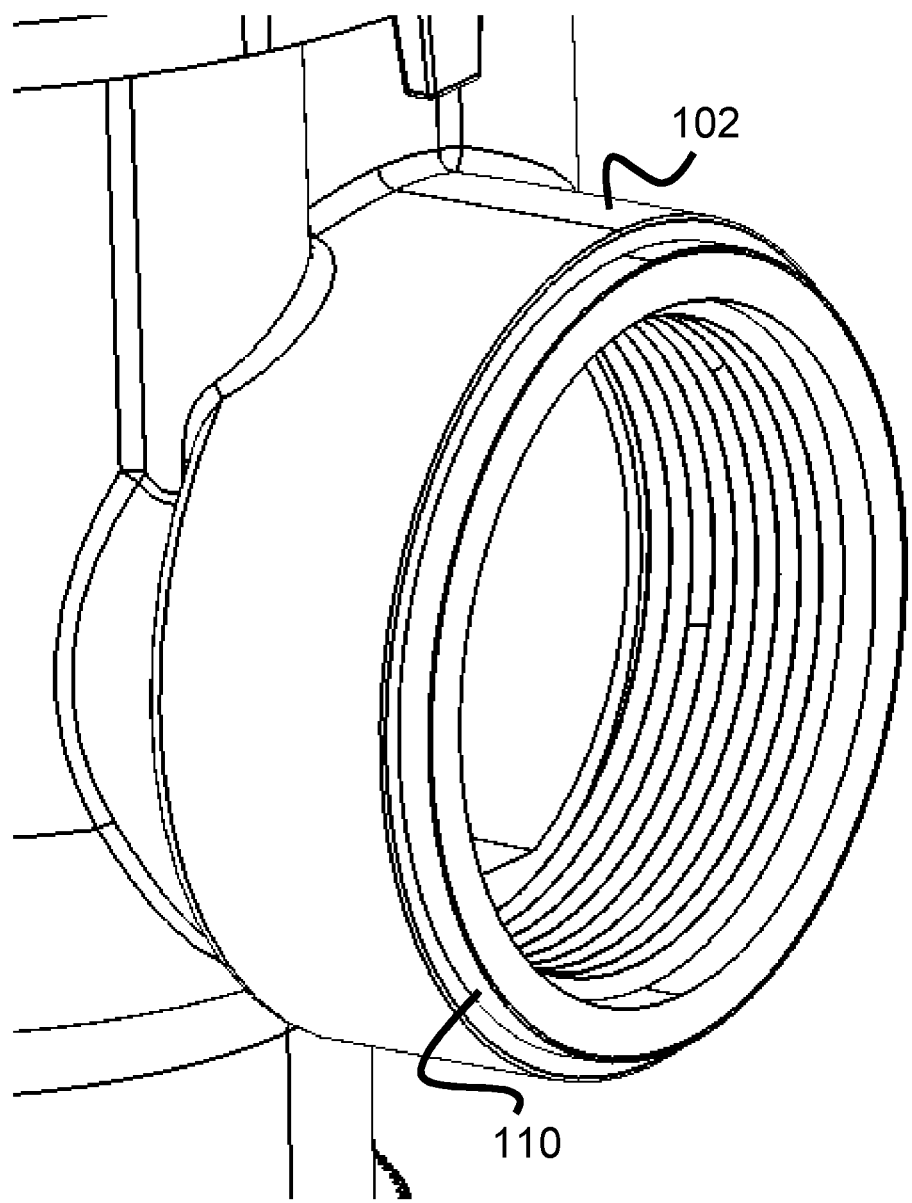
FIG. 4 illustrates a front view of a metal sleeve reinforced inlet according to a preferred embodiment of the present invention.
Figure 5:
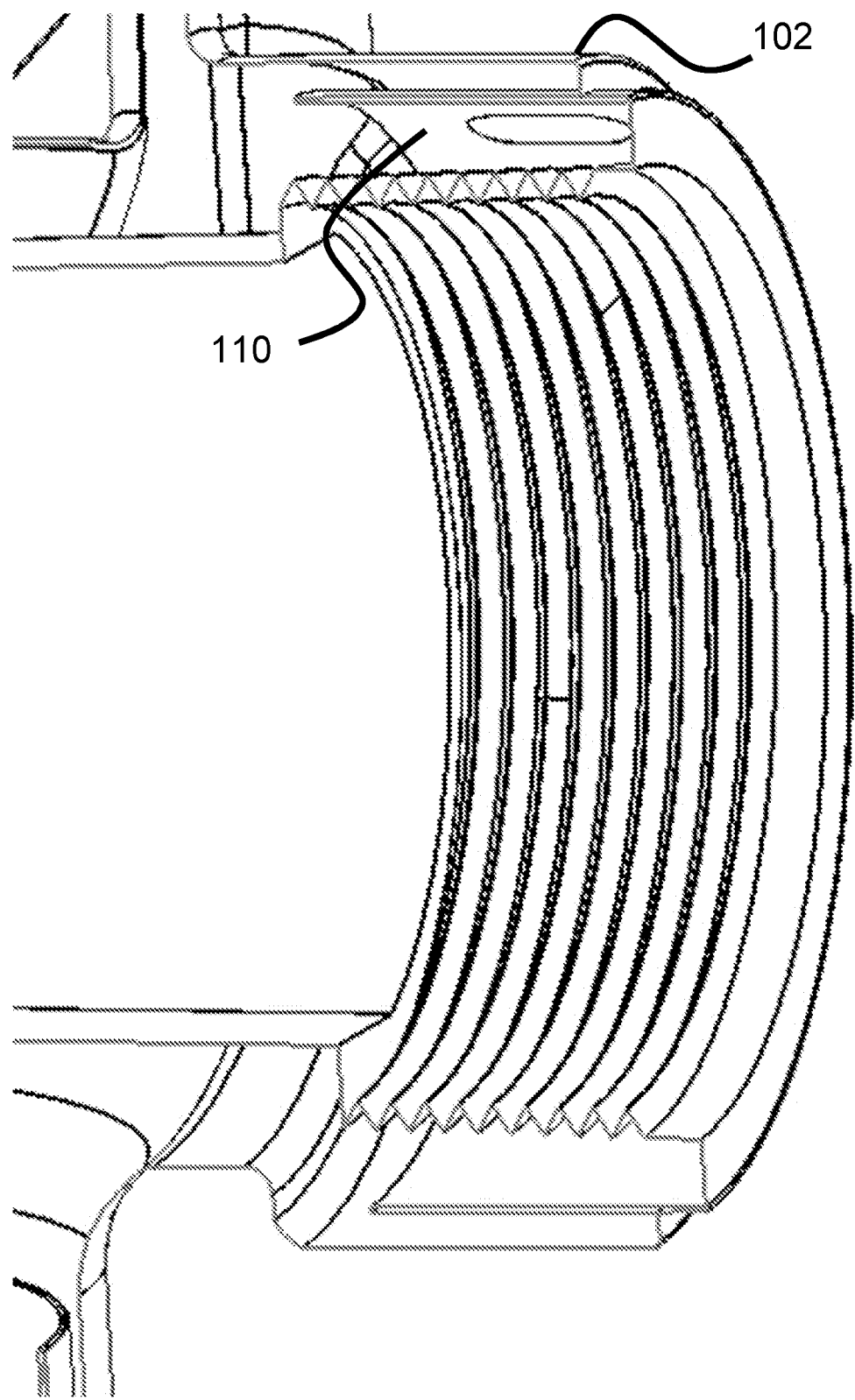
FIG. 5 illustrates a perspective view of a metal sleeve reinforced inlet where the metal sleeve is embedded between an outer diameter and the inner threaded diameter of the inlet.

FIGS. 1-3 illustrate an irrigation valve 100 with a valve body 101. One side of the valve body comprises an inlet 102 and the opposite side of the valve body comprises a first outlet 104. The valve body may also comprise an optional second outlet 106 extending downward from the valve body and perpendicular to the inlet and the first outlet.

FIGS. 1-3 further illustrate that each of the inlet 102, first outlet 104 and optional second outlet 106 may include a reinforcement sleeve 110 composed of metal or a similar material.

According to preferred embodiments of the present invention, the reinforcement sleeve 110 is positioned in between an outer diameter and the inner threaded diameter in the inlet, first outlet and optional second outlet of the valve body.

As can be seen in FIGS. 4-7, in some preferred embodiments, a small portion of the outer end of the sleeve 110 may be outwardly exposed in order to form a "step". This "step" is formed in order to allow the sleeve 110 to expand relative to the surrounding plastic of the inlet/outlets during temperature changes (e.g., longitudinal expansion).

Figure 6:
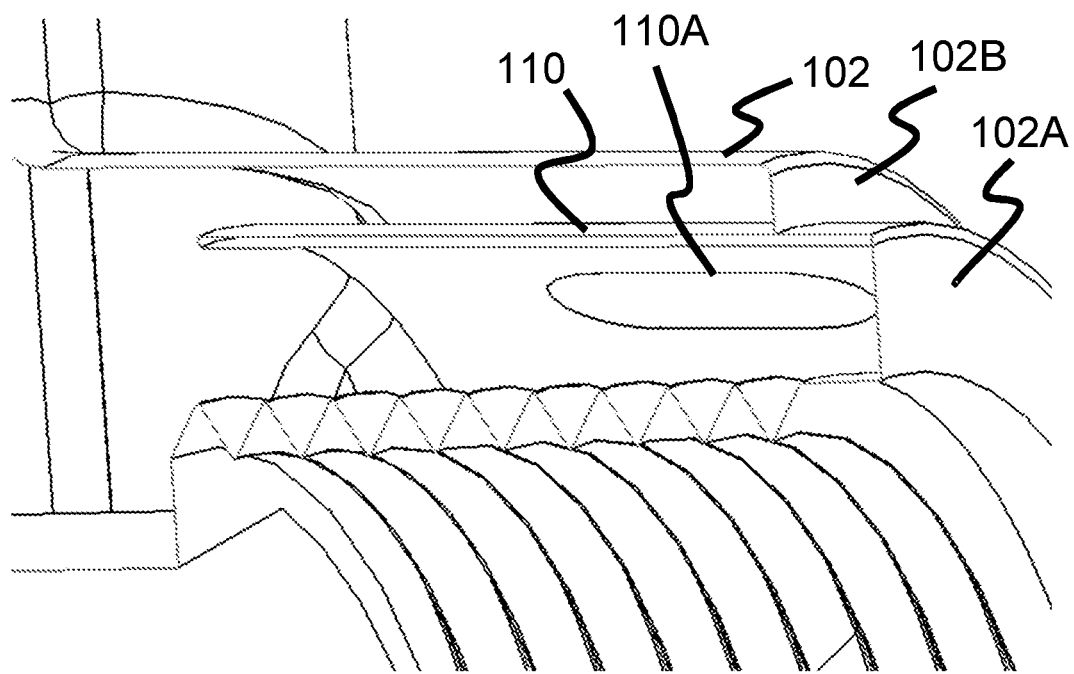
FIG. 6 illustrates a magnified front sectional view of an inlet with a metal sleeve embedded between an outer diameter and an inner threaded diameter of the inlet.
Figure 7:
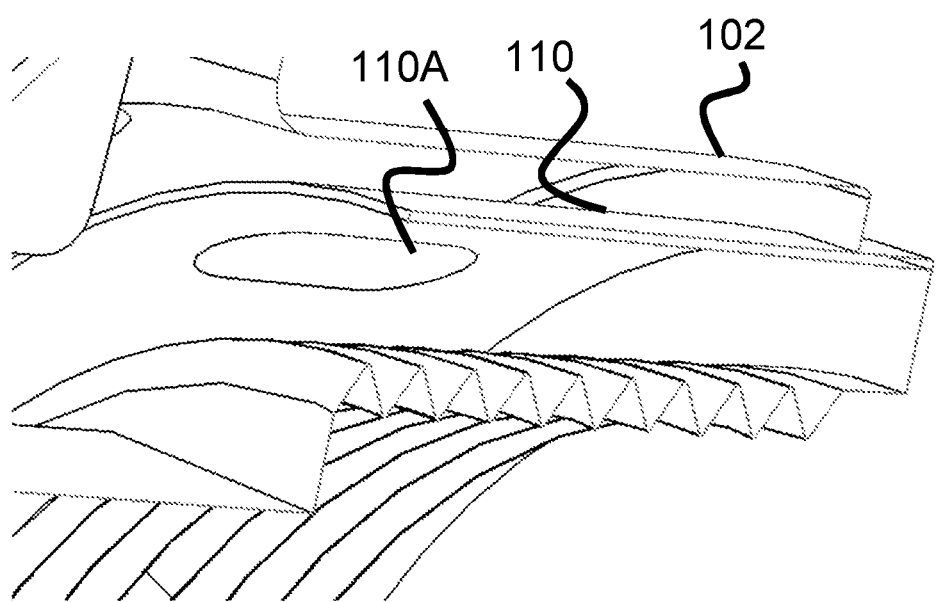
FIG. 7 illustrates a front sectional view of an inlet with a metal sleeve embedded between an outer diameter and an inner threaded diameter of the inlet.

For example, FIG. 6 illustrates in detail that an outer end 102A of the sleeve 110 extends outwardly more than an outer portion 102B of the outer diameter 102 of the inlet and forms a "step". The formation of the "step" allows the sleeve 110 to extend outward more than outer diameter and the inner threaded diameter of the inlet/outlets.

Alternately, the sleeve 110 can be completely covered by the material of the inlet 102 or outlets 104/106.

Figure 8:
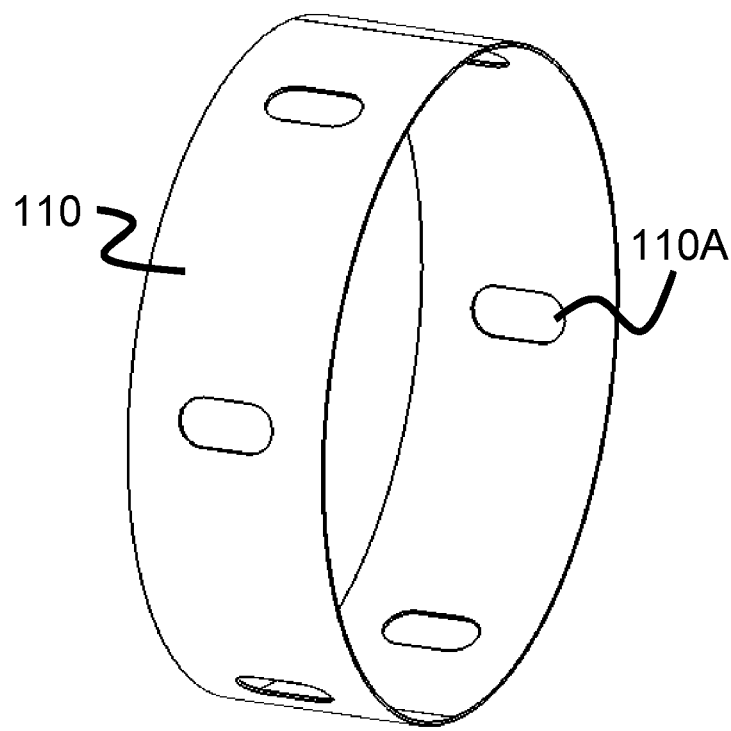
FIG. 8 illustrates a perspective view of the metal sleeve.
Figure 9:
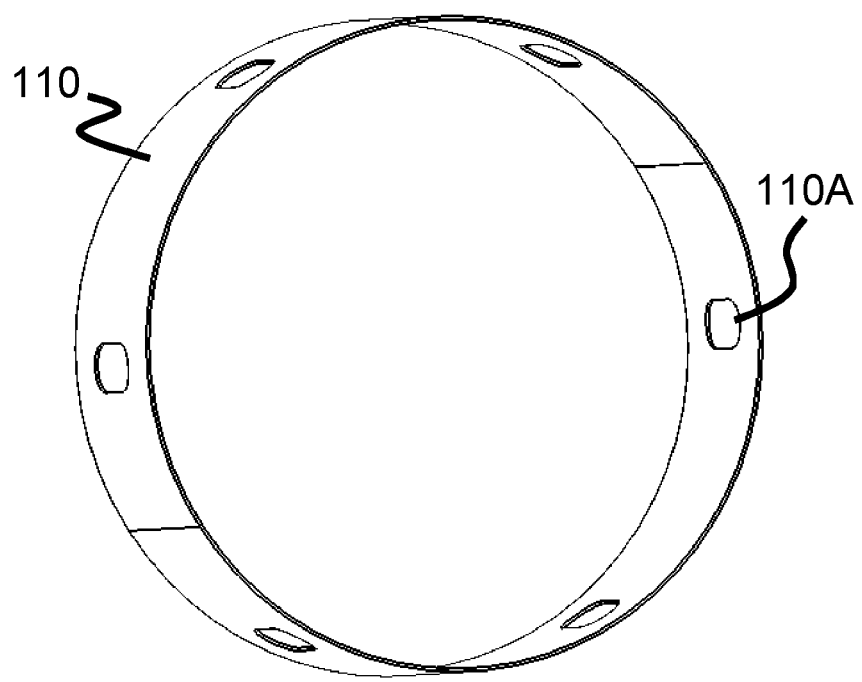
FIG. 9 illustrates a front view of the metal sleeve.

As best seen in FIGS. 8 and 9, the reinforcement sleeve 110 is preferably a continuous circular or cylindrical shape with a plurality of apertures 110A to help retain the sleeve 110 in place. The sleeve 110 can be composed of a metal, such as stainless steel or aluminum, or can be composed of other types of polymers that will not melt during an injection molding process. The sleeve 110 can have a variety of sizes, depending on the size of the valve it is being mounted in. For example, the sleeve 110 may have an inner diameter of about 3.95 inches, an outer diameter of about 4 inches, and a width of about 1.25 inches. Preferably the sleeve 100 is a continuously attached cylinder, however, the cylindrical shape may also have a break along its length (e.g., a "C" shape).

Figure 10:
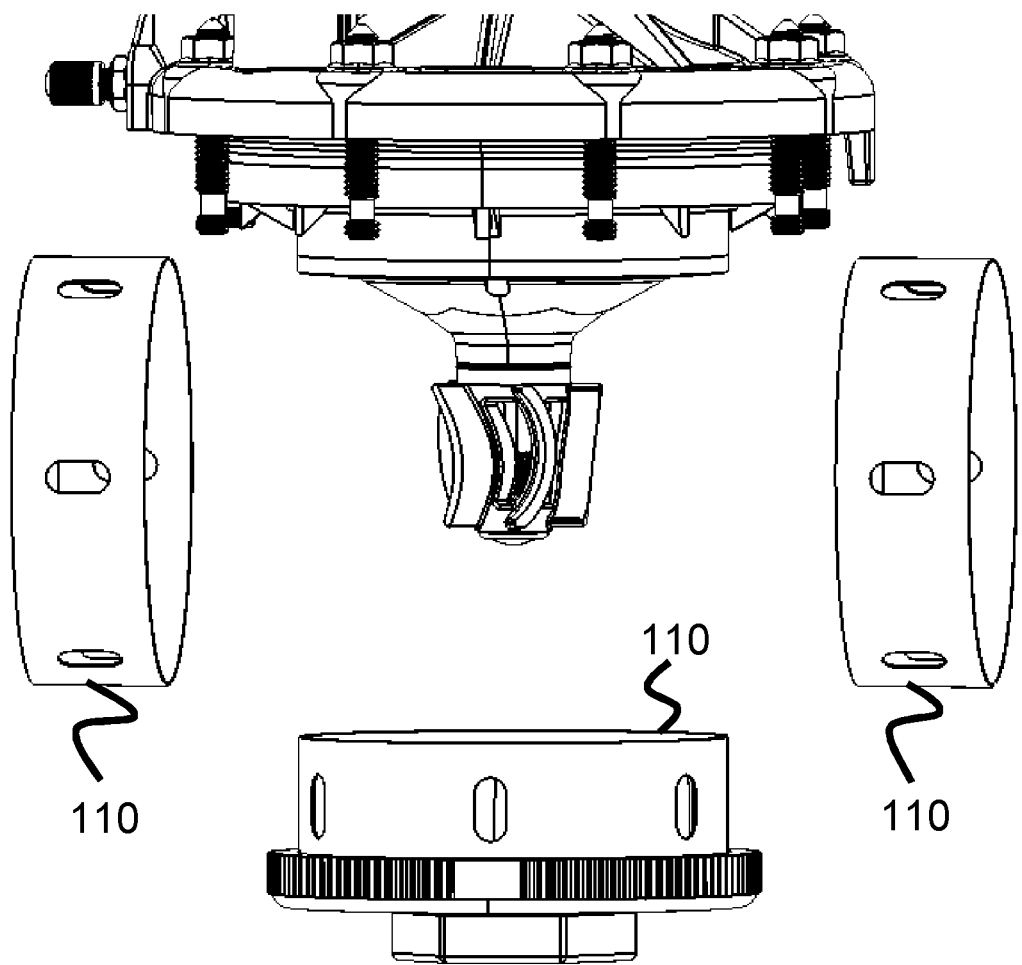
FIG. 10 illustrates an exploded view of the sprinkler valve body and the metal sleeves with respect to the positions of the inlet, outlet and optional second outlet.

As seen in the view of FIG. 10 with the main valve body 101 removed for clarity, the sleeves 110 can be used on one or more (or all) of the inlets/outlets.

In some preferred embodiments, the main valve body 101 is created around the sleeve 110 during the injection molding process. Specifically, the sleeve(s) 110 are placed at the desired locations of the inlets/outlets in the injection mold. Next, the molten plastic/polymer/nylon material is injected into the mold. This molten plastic/polymer/nylon flows through the apertures 110A of the sleeves 110 forming the inlet and the first and the optional second outlet around the sleeves. The apertures help mechanically retain the sleeve 110 in place.

However, in an alternate embodiment, the sleeve(s) 110 can be inserted into the valve body 101 after the injection molding process. For example, the valve body 101 can be created with an annular groove within the outer diameter 102 and the inner threaded diameter of the inlet/outlets. Once cooled and hardened, the sleeve 110 can be inserted into the groove with adhesive to lock it into place.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation valve body comprising:
an inlet;
an outlet; and,
a passage therebetween;
wherein one or more of the inlet and the outlet further comprise:
an outer diameter;
a threaded inner diameter; and
a reinforcement sleeve embedded between said outer diameter and said threaded inner diameter; wherein said reinforcement sleeve is partially outwardly exposed so as to form a smaller diameter step with said outer diameter and to allow said reinforcement sleeve to expand relative to said outer diameter and said inner diameter.

2. The irrigation valve body of claim 1, wherein said outer diameter and said threaded inner diameter are made of a plastic material.

3. The irrigation valve body of claim 1, wherein said outer diameter and said threaded inner diameter are made of a nylon material.

4. The irrigation valve body of claim 1, wherein said reinforcement sleeve comprises a metal.

5. The irrigation valve body of claim 4, wherein said metal includes stainless steel or aluminum.

6. The irrigation valve body of claim 1, wherein said reinforcement sleeve comprises a polymer that will not melt during an injection molding process.

7. The irrigation valve body of claim 1, wherein said reinforcement sleeve forms a continuous circular or cylindrical shape with a plurality of apertures.

8. The irrigation valve body of claim 7, wherein said cylindrical shape comprises a break along its length forming a C-shape.

9. A valve body comprising:
an inlet having a first outer diameter and a first threaded inner diameter;
an outlet having a second outer diameter and a second threaded inner diameter; and,
a first reinforcement sleeve embedded in between said first outer diameter and said first threaded inner diameter; wherein said first reinforcement sleeve is partially outwardly exposed so as to form a smaller diameter step with said first outer diameter and to allow said first reinforcement sleeve to expand relative to said first outer diameter and said first inner diameter; and,
a second reinforcement sleeve embedded in between said second outer diameter and said second threaded inner diameter; wherein said second reinforcement sleeve is partially outwardly exposed so as to form a smaller diameter step with said second outer diameter and to allow said second reinforcement sleeve to expand relative to said second outer diameter and said second inner diameter.

10. The valve body of claim 9, further comprising a second outlet having a third outer diameter and a third threaded inner diameter; and a third reinforcement sleeve embedded between said third outer diameter and said third threaded inner diameter.

11. The valve body of claim 9, wherein said inlet and said outlet are composed of plastic and wherein said reinforcement sleeve comprises a metal.

12. The valve body of claim 11, wherein said metal includes stainless steel or aluminum.

13. The valve body of claim 9, wherein said reinforcement sleeve comprises a polymer that will not melt during an injection molding process.

14. The valve body of claim 9, wherein said first reinforcement sleeve forms a continuous circular or cylindrical shape with a plurality of apertures.

15. The valve body of claim 14, wherein said cylindrical shape comprises a break along its length forming a C-shape.

16. An irrigation valve body comprising:
an inlet comprising a first reinforcement sleeve;
an outlet comprising a second reinforcement sleeve; and,
a passage extending between said inlet and outlet;
wherein said first reinforcement sleeve and said second reinforcement sleeve each having a plurality of apertures; and,
wherein injection molded plastic is positioned through said plurality of apertures;
wherein said first reinforcement sleeve is embedded in between a first outer diameter of said inlet and a first threaded inner diameter of said inlet; wherein said first reinforcement sleeve is partially outwardly exposed so as to form a smaller diameter step with said first outer diameter and to allow said first reinforcement sleeve to expand relative to said first outer diameter and said first inner diameter; and,
wherein said second reinforcement sleeve is embedded in between a second outer diameter of said outlet and a second threaded inner diameter of said outlet; wherein said second reinforcement sleeve is partially outwardly exposed so as to form a smaller diameter step with said second outer diameter and to allow said second reinforcement sleeve to expand relative to said second outer diameter and said second inner diameter.

17. The irrigation valve body of claim 16, wherein said first reinforcement sleeve and said second reinforcement sleeve comprise an inner diameter of 3.95 inches, an outer diameter of 4 inches, and a width of 1.25 inches.

* * * * *